United States Patent
Kato et al.

(10) Patent No.: US 11,367,318 B2
(45) Date of Patent: Jun. 21, 2022

(54) APPARATUS FOR MANAGING VESSEL FOULING RISK, PROGRAM, AND RECORDING MEDIUM

(71) Applicant: Nippon Yusen Kabushiki Kaisha, Tokyo (JP)

(72) Inventors: Jun Kato, Tokyo (JP); Kentaro Sato, Toyko (JP); Yoshihiko Maeda, Toyko (JP)

(73) Assignee: Nippon Yusen Kabushiki Kaisha, Tokyo (JP)

( * ) Notice: Subject to any disclaimer, the term of this patent is extended or adjusted under 35 U.S.C. 154(b) by 1132 days.

(21) Appl. No.: 15/745,352

(22) PCT Filed: Jul. 17, 2015

(86) PCT No.: PCT/JP2015/070517
§ 371 (c)(1),
(2) Date: Jan. 16, 2018

(87) PCT Pub. No.: WO2017/013704
PCT Pub. Date: Jan. 26, 2017

(65) Prior Publication Data
US 2018/0211453 A1    Jul. 26, 2018

(51) Int. Cl.
*B63B 59/04* (2006.01)
*G01P 5/00* (2006.01)
(Continued)

(52) U.S. Cl.
CPC ............ *G07C 5/0808* (2013.01); *B63B 59/04* (2013.01); *G01P 5/00* (2013.01); *G06Q 10/20* (2013.01)

(58) Field of Classification Search
CPC ............ B63B 59/04; G06Q 10/20; G01P 5/00
See application file for complete search history.

(56) References Cited

U.S. PATENT DOCUMENTS

| 7,686,936 B1* | 3/2010 | Staerzl | .................. C23F 13/02 |
| | | | 205/726 |
| 2005/0118134 A1* | 6/2005 | Waldron | ................. A01N 59/20 |
| | | | 424/78.09 |

(Continued)

FOREIGN PATENT DOCUMENTS

| JP | 2012251158 A | 12/2012 |
| JP | 2015508326 A | 3/2015 |
| JP | 2006183059 A | 7/2016 |

OTHER PUBLICATIONS

Interational Search Report issued in corresponding PCT Application No. PCT/JP2015/070517 dated Oct. 6, 2015, 4 pages.

(Continued)

*Primary Examiner* — Eman A Alkafawi
(74) *Attorney, Agent, or Firm* — MKG, LLC

(57) ABSTRACT

Reception unit receives data indicating water temperature of a body of water through which a vessel voyages, vessel speed, and a period for which those values are maintained. From storage unit, index value acquisition unit reads out a decrease amount of anti-fouling paint corresponding to the water temperature and vessel speed received by reception unit. Index value specification unit specifies a decrease amount of anti-fouling paint in the period by multiplying the length of time of the period received by reception unit by the decrease amount read out by index value acquisition unit. Remaining amount acquisition unit integrates the decrease amounts of the anti-fouling paint specified by index value specification unit at the time of coating with the anti-fouling paint and onward. Remaining amount specification unit specifies a current paint film thickness of the anti-fouling paint by subtracting the decrease amount of the anti-fouling paint integrated by remaining amount acquisition unit from the paint film thickness at the time of coating with the anti-fouling paint.

13 Claims, 8 Drawing Sheets

(51) Int. Cl.
*G07C 5/08* (2006.01)
*G06Q 10/00* (2012.01)

(56) References Cited

U.S. PATENT DOCUMENTS

| | | | |
|---|---|---|---|
| 2014/0076225 A1* | 3/2014 | Smith | B63B 59/08 |
| | | | 114/222 |
| 2014/0081504 A1* | 3/2014 | Smith | B63B 17/00 |
| | | | 701/23 |
| 2015/0134545 A1* | 5/2015 | Mann | G06F 30/13 |
| | | | 705/305 |
| 2016/0083592 A1* | 3/2016 | Olsen | C09D 5/1675 |
| | | | 428/447 |
| 2016/0168720 A1* | 6/2016 | Jain | C04B 20/107 |
| | | | 428/335 |

OTHER PUBLICATIONS

Extended European Search Report issued in corresponding European Application No. 15898866.7 dated Feb. 12, 2019, pp. 1-7.
"Marine Fouling and Antifouling I-07" Wattyl Industrial Coatings, Valspar Version 4, Jun. 1, 2014, 2 pages.
Soren Vinther Hensen et al., "Performance Monitoring of Ships", Jan. 1, 2012, 214 pages.

\* cited by examiner

| PERIOD | DEADWEIGHT (tons) | WIND SPEED (m/sec) | TIDAL SPEED (knots) | WATER TEMPERATURE (°C) |
|---|---|---|---|---|
| ⋮ | ⋮ | ⋮ | ⋮ | ⋮ |
| STARTING TIME: MAY 15, 2015 12:30<br>ENDING TIME: MAY 15, 2015 12:31 | 21300 | 2.5 | 0.5 | 12 |
| STARTING TIME: MAY 15, 2015 12:31<br>ENDING TIME: MAY 15, 2015 12:32 | 21300 | 2.5 | 0.5 | 12 |
| STARTING TIME: MAY 15, 2015 12:32<br>ENDING TIME: MAY 15, 2015 12:33 | 21300 | 3.0 | 0.5 | 12 |

| VESSEL SPEED (knots) | POSITION (LATITUDE, LONGITUDE) | FUEL CONSUMPTION PER UNIT TIME (tons/day) |
|---|---|---|
| ⋮ | ⋮ | ⋮ |
| 20 | (7°, 135°) | 56.6 |
| 20 | (7°, 135°) | 56.6 |
| 20 | (7°, 135°) | 56.6 |

PAINT NAME: Paint C

| WATER TEMPERATURE (°C) | VESSEL SPEED (knots) | PAINT DECREASE AMOUNT PER UNIT TIME (mm/day) |
|---|---|---|
| 10 | 0 | LESS THAN 1 DAY: 0.035<br>1 DAY OR MORE, AND LESS THAN 3 DAYS: 0.031<br>3 DAYS OR MORE, AND LESS THAN 5 DAYS: 0.012<br>5 DAYS OR MORE, AND LESS THAN 10 DAYS: 0.007<br>10 DAYS OR MORE: 0.005 |
| 10 | 1 | 0.037 |
| 10 | 2 | 0.038 |
| ⋮ | ⋮ | ⋮ |

PAINT NAME: Paint C

| BODY OF WATER | ATTACHMENT STRENGTH |
|---|---|
| AREA A | 0.2 |
| AREA B | 5.3 |
| ⋮ | ⋮ |

FIG. 8

PAINT NAME: Paint C

| VESSEL SPEED (knots) | PAINT DECREASE AMOUNT PER UNIT TIME (mm/day) | INDEX VALUE FOR REFERENCE RESISTANCE INCREASE AMOUNT PER UNIT TIME |
|---|---|---|
| 5 | 0.035 | 0.0018 |
| 5 | 0.036 | 0.0016 |
| ⋮ | ⋮ | ⋮ |

FIG. 9

VESSEL NAME: SHIP K

| PERIOD | DEADWEIGHT (tons) | WIND SPEED (m/sec) | TIDAL SPEED (knots) | WATER TEMPERATURE (°C) | VESSEL SPEED (knots) | POSITION (LATITUDE, LONGITUDE) | FUEL CONSUMPTION PER UNIT TIME (tons/day) |
|---|---|---|---|---|---|---|---|
| ... | ... | ... | ... | ... | ... | ... | ... |
| STARTING TIME: MAY 15, 2015 11:56 ENDING TIME: MAY 15, 2015 12:15 | 21300 | 3.0 | 0.5 | 13 | 20 | (7°, 136°) | 60.3 |
| STARTING TIME: MAY 15, 2015 12:15 ENDING TIME: MAY 15, 2015 12:32 | 21300 | 2.5 | 0.5 | 12 | 20 | (7°, 135°) | 56.6 |

| BODY OF WATER | CORRECTED VESSEL SPEED (knot) | INTRA-PERIOD PAINT DECREASE AMOUNT (mm) | CUMULATIVE PAINT DECREASE AMOUNT (mm) | PAINT REMAINING AMOUNT (mm) | INTRA-PERIOD $R_k$ INCREASE AMOUNT | ESTIMATED $R_k$ | ACTUAL $R_k$ |
|---|---|---|---|---|---|---|---|
| ... | ... | ... | ... | ... | ... | ... | ... |
| AREA X | 20.7 | 0.00073 | 67.68987 | 57.31013 | 0.00000 | 0.04578 | 0.04593 |
| AREA X | 20.3 | 0.00077 | 67.69064 | 57.30936 | 0.00000 | 0.04578 | 0.04584 |

FIG. 10

APPARATUS FOR MANAGING VESSEL FOULING RISK, PROGRAM, AND RECORDING MEDIUM

TECHNICAL FIELD

The present invention relates to a technique for managing vessel fouling risk.

BACKGROUND

When foreign matter such as an organism attaches to a water contacting surface of a vessel, resistance during a voyage of the vessel increases, thus incurring an increase in the maintenance burden due to a reduction in vessel speed, an increase in fuel consumption, and an increase in the main engine load. Also, when organisms attach to the water contacting surface of a vessel, the organisms are dispersed beyond their original habitat accompanying movement of the vessel, and thus there is a risk of adversely affecting the ecosystem.

The water contacting surface of the vessel is coated with an anti-fouling paint in order to prevent or suppress attachment of organisms and the like to the water contacting surface of the vessel. An anti-fouling agent contained in an anti-fouling paint for vessels that is widely used dissolves in water and thereby generates copper ions, which organisms dislike, thereby suppressing attachment of the organisms. Also, in the anti-fouling paint of the type in which the anti-fouling paint itself dissolves, the surface of the vessel body is renewed due to the anti-fouling paint dissolving, and attached foreign matter is prevented from remaining on the vessel body.

Japanese Patent Application Publication No. JP2012-251158 is an example of literature that discloses a technique relating to an anti-fouling paint for a vessel. Japanese Patent Application Publication No. JP2012-251158 proposes a non-tin-based anti-fouling paint composition that has a suitable paint film consumption rate from initial immersion in water, and according to which an excellent anti-fouling performance can be exhibited continuously for a long time against organisms that attach to a vessel, underwater structure, or the like.

SUMMARY OF INVENTION

If all of the anti-fouling agent in the anti-fouling paint covering the vessel dissolves, foreign matter such as organisms will rapidly attach to the vessel body, resulting in an increase in fuel consumption, a reduction in vessel speed, and an adverse effect on the ecosystem. Accordingly, a company that operates the vessel or the like needs to add a coat of the anti-fouling paint to the vessel body before all of the anti-fouling agent dissolves.

Also, even if the vessel body is coated with the anti-fouling paint in which the anti-fouling agent remains, attachment of foreign matter such as organisms to the vessel body sometimes occurs in the case where the vessel is stopped or moored for a long period of time, or in the case of voyaging through a body of water inhabited by organisms with a strong attachment force. If the amount of foreign matter attached to the vessel body increases by a certain extent or more, it is necessary to perform a cleaning task for removing the attached foreign matter from the vessel body in order to recover the reduced vessel speed, reduce the increased fuel consumption, and optimize the main engine load.

Conventionally, the company that operates the vessel or the like determined the timing of adding a coat of the anti-fouling paint, the type of anti-fouling paint to be added, and the paint film thickness using individual and sensory grounds, such as intuition and experience, based on information such as vessel speed and water temperature during a voyage of the vessel. For this reason, a coat of the anti-fouling paint was added at an inappropriate timing, or the vessel body was coated using an inappropriate type or amount of the anti-fouling paint.

Also, conventionally, the company that operates the vessel or the like used individual or sensory grounds, such as intuition and experience, to estimate the degree of advancement of the attachment of the organisms to the vessel body due to stopping or mooring the vessel or a voyage through a body of water inhabited by organisms with a strong attachment force. For this reason, in some cases, the foreign matter attaches to the vessel body more rapidly than expected, and an unplanned cleaning task becomes necessary.

Accordingly, the company that operates the vessel or the like needs to obtain information relating to the fouling state of the vessel body, such as the remaining amount of anti-fouling agent contained in the anti-fouling paint and the degree of advancement of the attachment of foreign matter to the vessel body.

In view of the foregoing circumstance, the present invention aims to provide a unit for enabling a company that operates the vessel or the like to obtain objective information relating to the fouling state of the vessel.

In order to solve the foregoing problem, the present invention proposes, as a first aspect, an apparatus including; a parameter acquisition unit for acquiring a parameter relating to an environment in which a vessel is placed; an index value acquisition unit for acquiring a first index value indicating a likelihood of occurrence of fouling of a water contacting surface of the vessel per unit time in the environment; and an index value specification unit for specifying a second index value indicating the likelihood of the occurrence of fouling of the water contacting surface of the vessel in a first period in the environment, based on the first index value.

In the apparatus according to the first aspect, as a second aspect, it is possible to use a configuration in which the parameter acquisition unit acquires water temperature and vessel speed as the parameters, and the first index value and the second index value indicate decrease amounts of an anti-fouling paint on the water contacting surface of the vessel or an anti-fouling component contained in the anti-fouling paint.

In the apparatus according to the second aspect, as a third aspect, it is possible to use a configuration in which the parameter acquisition unit acquires the parameters for each of a plurality of periods constituting the first period, the index value acquisition unit acquires the first index value for each of the plurality of periods, and for each of the plurality of periods, based on the first index value acquired by the index value acquisition unit for the period, the index value specification unit specifies a third index value indicating the likelihood of the occurrence of fouling of the water contacting surface of the vessel in an environment indicated by the parameters acquired by the parameter acquisition unit for the period, and specifies the second index value based on a plurality of the third index values that were specified.

In the apparatus according to the third aspect, as a fourth aspect, it is possible to use a configuration including: a remaining amount acquisition unit for acquiring a remaining amount of the anti-fouling paint on the water contacting surface of the vessel or the anti-fouling component contained in the anti-fouling paint at a start timing of the first period; and a remaining amount specification unit for specifying a remaining amount of the anti-fouling paint on the water contacting surface of the vessel or the anti-fouling component contained in the anti-fouling paint at an end timing of the first period, based on the remaining amount of the anti-fouling component and the second index value.

In the apparatus according to the third aspect, as a fifth aspect, it is possible to use a configuration in which the index value acquisition unit acquires the first index value for each of a plurality of types of anti-fouling paint, and the index value specification unit specifies the second index value for each of the plurality of types of anti-fouling paint.

In the apparatus according to the second aspect, as a sixth aspect, it is possible to use a configuration including; a decrease amount acquisition unit for acquiring a measurement value of the decrease amount of the anti-fouling paint on the water contacting surface of the vessel or the anti-fouling component contained in the anti-fouling paint in the first period; and an index value correction unit for, for each of a plurality of the first periods, correcting the first index value based on the parameters acquired by the parameter acquisition unit and the measurement value acquired by the decrease amount acquisition unit.

In the apparatus according to the first aspect, as a seventh aspect, it is possible to use a configuration in which the parameter acquisition unit acquires a vessel speed and a position of the vessel as the parameters, and the first index value and the second index value indicate degrees of influence that attached matter on the water contacting surface of the vessel has on an increase in resistance that occurs during a voyage of the vessel.

In the apparatus according to the seventh aspect, as an eighth aspect, it is possible to use a configuration in which the parameter acquisition unit acquires the decrease amount of the anti-fouling paint on the water contacting surface of the vessel or the anti-fouling component contained in the anti-fouling paint, as the parameter.

In the apparatus according to the first aspect, as a ninth aspect, it is possible to use a configuration in which the parameter acquisition unit acquires the vessel speed of the vessel or a physical amount correlated with the vessel speed of the vessel, and the fuel consumption of the vessel or a physical amount correlated with the fuel consumption of the vessel, as the parameters, and the first index value and the second index value indicate degrees of influence that attached matter on the water contacting surface of the vessel has on an increase in resistance that occurs during the voyage of the vessel.

In the apparatus according to any of the seventh to ninth aspects, as a tenth aspect, it is possible to use a configuration in which the parameter acquisition unit acquires the parameter for each of a plurality of periods constituting the first period, the index value acquisition unit acquires the first index value for each of the plurality of periods, and for each of the plurality of periods, based on the first index value acquired by the index acquisition unit for the period, the index value specification unit specifies a third index value indicating the degree of influence that attached matter on the water contacting surface of the vessel has on an increase in resistance that occurs during the voyage of the vessel in the environment indicated by the parameter acquired by the parameter acquisition unit for the period, and specifies the second index value based on a plurality of the third index values that were specified.

In the apparatus according to the tenth aspect, as an eleventh aspect, it is possible to use a configuration in which the index value acquisition unit acquires the first index value for each of a plurality of types of anti-fouling paint, and the index value specification unit specifies the second index value for each of the plurality of types of anti-fouling paint.

In the apparatus according to the seventh aspect, as a twelfth aspect, it is possible to use a configuration including: an influence degree acquisition unit for acquiring a measurement value for the degree of influence that the attached matter on the water contacting surface of the vessel has on an increase in resistance that occurs during the voyage of the vessel in the first period; and an index value correction unit for, for each of a plurality of the first periods, correcting the first index value based on the parameter acquired by the parameter acquisition unit and the measurement value acquired by the influence degree acquisition unit.

Also, the present invention proposes, as a thirteenth aspect, a program for causing a computer to execute: processing for acquiring a parameter relating to an environment in which a vessel is placed; processing for acquiring a first index value indicating a likelihood of occurrence of fouling of a water contacting surface of the vessel per unit time in the environment; and processing for specifying a second index value indicating a likelihood of occurrence of fouling of the water contacting surface of the vessel in a first period in the environment, based on the first index value.

Also, the present invention proposes, as a fourteenth aspect, a computer-readable storage medium permanently storing a program for causing a computer to execute: processing for acquiring a parameter relating to an environment in which a vessel is placed; processing for acquiring a first index value indicating a likelihood of occurrence of fouling of a water contacting surface of the vessel per unit time in the environment; and processing for specifying a second index value indicating the likelihood of the occurrence of fouling of the water contacting surface of the vessel in a first period in the environment, based on the first index value.

According to the first aspect of the present invention, the company that operates the vessel or the like can obtain objective information relating to the likelihood of the occurrence of fouling of the vessel accompanying a voyage of the vessel in a certain period.

According to the second aspect of the present invention, the company that operates the vessel or the like can know the decrease amount of the anti-fouling paint or the anti-fouling component contained in the anti-fouling paint accompanying a voyage of the vessel in a certain period.

According to the third aspect of the present invention, the company that operates the vessel or the like can know the decrease amount of the anti-fouling paint or the anti-fouling component contained in the anti-fouling paint accompanying a voyage of the vessel over a long period.

According to the fourth aspect of the present invention, the company that operates the vessel or the like can know the remaining amount of the anti-fouling paint or the anti-fouling component contained in the anti-fouling paint coating the vessel body at a certain point in time.

According to the fifth aspect of the present invention, the company that operates the vessel or the like can specify the appropriate anti-fouling paint from the viewpoint of the decrease amount of the anti-fouling paint or the anti-fouling component contained in the anti-fouling paint.

According to the sixth aspect of the present invention, a more accurate decrease amount of the anti-fouling paint or the anti-fouling component contained in the anti-fouling paint is specified compared to the case in which the index value is not corrected.

According to the seventh aspect of the present invention, the company that operates the vessel or the like can know the degree of the increase in the resistance that occurs during the voyage of the vessel accompanying the advancement of fouling of the vessel body in a certain period.

According to the eighth aspect of the present invention, the degree of the increase in the resistance that occurs during the voyage of the vessel is specified more accurately in comparison to the case in which the decrease amount of the anti-fouling paint or the anti-fouling component contained in the anti-fouling paint is not used as a parameter.

According to the ninth aspect of the present invention, the degree of the increase in the resistance that occurs during the voyage of the vessel is specified based on the vessel speed of the vessel, fuel consumption, and the like.

According to the tenth aspect of the present invention, the company that operates the vessel or the like can know the degree of the increase in the resistance that occurs during the voyage of the vessel over a long period.

According to the eleventh aspect of the present invention, the company that operates the vessel or the like can specify the appropriate anti-fouling paint from the viewpoint of the degree of increase in the resistance that occurs during a voyage of the vessel.

According to the twelfth aspect of the present invention, the degree of increase in the resistance that occurs during the voyage of the vessel is specified more accurately in comparison to the case in which the index value is not corrected.

According to the thirteenth or fourteenth aspect of the present invention, the apparatus according to the first aspect of the present invention is realized by a computer.

BRIEF DESCRIPTION OF DRAWINGS

FIG. 8 is a diagram illustrating a data configuration of an attachment strength master table stored in a server apparatus according to an embodiment.

FIG. 9 is a diagram illustrating a data configuration of a resistance increase amount master table stored in a server apparatus according to an embodiment.

FIG. 10 is a diagram illustrating a data configuration of a log table stored in a server apparatus according to an embodiment.

DETAILED DESCRIPTION

Figure 1:
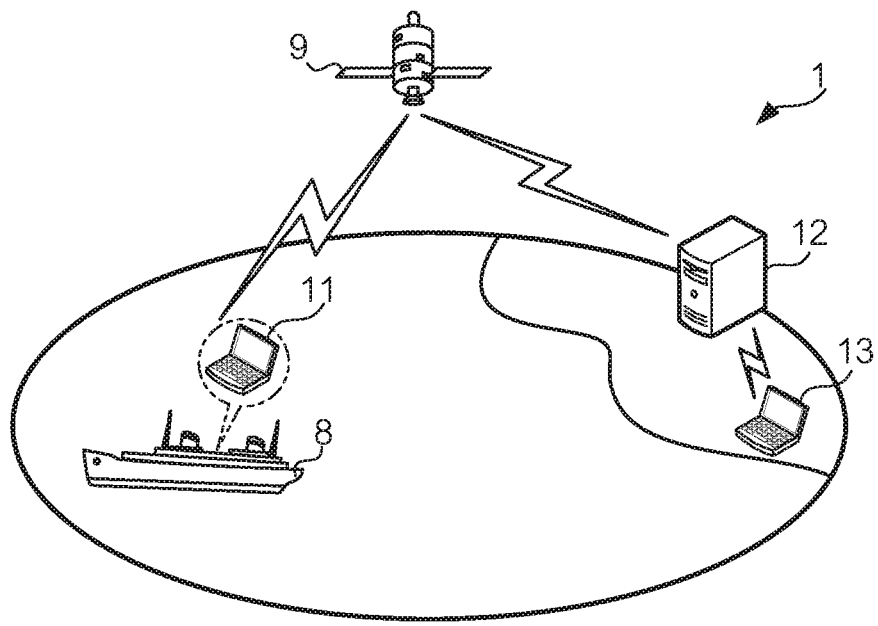
FIG. 1 is a diagram showing an overall configuration of a vessel body fouling risk management system according to an embodiment.

Hereinafter, vessel body fouling risk management system 1 according to an embodiment of the present invention will be described. FIG. 1 is a diagram showing an overall configuration of vessel body fouling risk management system 1. Vessel body fouling risk management system 1 is a system for managing the likelihood of the occurrence of fouling (hereinafter referred to as "fouling risk") caused by the attachment (hereinafter simply referred to as "fouling") of foreign matter such as organisms (hereinafter referred to as "attached matter") to the water contacting surface (hereinafter referred to as "vessel body") of vessel 8. Vessel body fouling risk management system 1 includes terminal apparatus 11 arranged on vessel 8, server apparatus 12 for performing data communication with terminal apparatus 11 via communication satellite 9, and terminal apparatus 13 arranged on land, for example.

Terminal apparatus 11 acquires parameters that influence fouling of the vessel body of vessel 8 and transmits the parameters to server apparatus 12. Also, a crew member or the like of vessel 8 uses terminal apparatus 11 to browse data accumulated in server apparatus 12.

Server apparatus 12 specifies index values indicating fouling risk based on parameters transmitted from terminal apparatus 11 and accumulates them. In the present embodiment, an index value indicating a remaining amount of an anti-fouling paint or an anti-fouling component contained in the anti-fouling paint (hereinafter referred to as "paint remaining amount"), and an index value indicating a degree of influence (hereinafter referred to as "resistance increase amount") that fouling of the vessel body has on an increase in resistance that occurs during a voyage of the vessel (hereinafter simply referred to as "resistance") are used as the index values for the fouling risk of the vessel. Specific examples of an index value for the paint remaining amount and an index value for the resistance increase amount will be described later.

A worker of a company that operates vessel 8, a staff member of a company that coats vessel 8 with the anti-fouling paint, a staff member of a company that manufactures the anti-fouling paint, or the like uses terminal apparatus 13 to browse the data accumulated in server apparatus 12.

Note that although only one each of vessel 8 and terminal apparatus 11 are shown in FIG. 1, there are normally multiple vessels 8 and terminal apparatuses 11. If there are multiple vessels 8 and terminal apparatuses 11, server 12 specifies the index values for the fouling risk based on the parameters sent from terminal apparatuses 11 regarding multiple vessels 8 and accumulates them. Also, although only one terminal apparatus 13 is shown in FIG. 1, the number of terminal apparatuses 13 changes depending on the number of users browsing the data stored in server apparatus 12.

Figure 2:
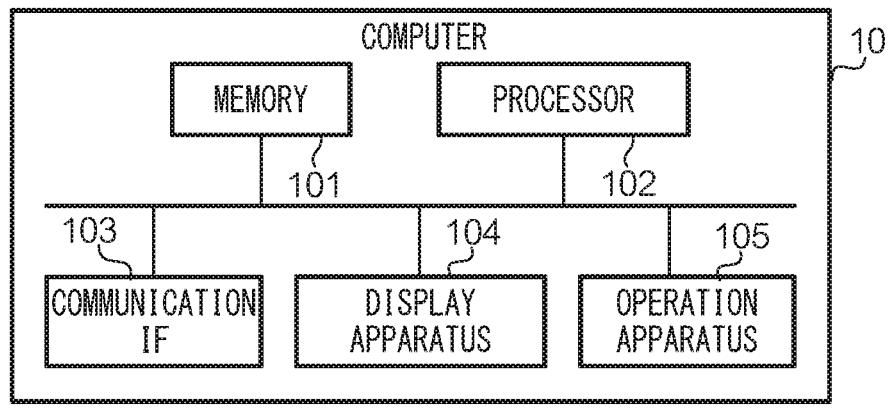
FIG. 2 is a diagram showing a basic configuration of a computer to be employed as hardware for a terminal apparatus according to an embodiment.

The hardware configurations of terminal apparatus 11 and terminal apparatus 13 are computers for general terminal apparatuses. FIG. 2 is a diagram showing a basic configuration of computer 10 employed as hardware for terminal apparatus 11 and terminal apparatus 13. Computer 10 includes: memory 101 that stores various types of data; processor 102 that performs various types of data processing according to programs stored in memory 101; communication IF 103, which is an IF (interface) for performing data communication with another apparatus; display apparatus 104 such as a liquid crystal display for displaying images to a user; and operation apparatus 105 such as a keyboard that receives user operations.

Note that an external display apparatus that is connected to computer 10 may be used instead of display apparatus 104 built in computer 10. Also, an external operation apparatus that is connected to computer 10 may be used instead of operation apparatus 105 built in computer 10.

Figure 3:
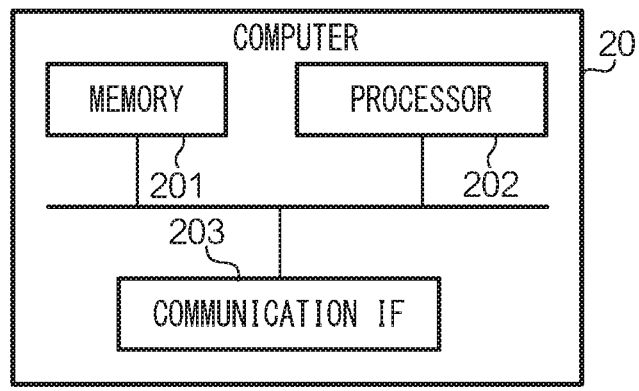
FIG. 3 is a diagram showing a basic configuration of a computer to be employed as hardware for a server apparatus according to an embodiment.

The hardware configuration of server apparatus 12 is a computer for a general server apparatus, for example. FIG. 3 is a diagram showing a basic configuration of computer 20 employed as hardware for server apparatus 12. Computer 20 includes: memory 201 that stores various types of data; processor 202 that performs various types of data processing according to programs stored in memory 201; and communication IF 203 for performing data communication with another apparatus.

Figures 4, 5:
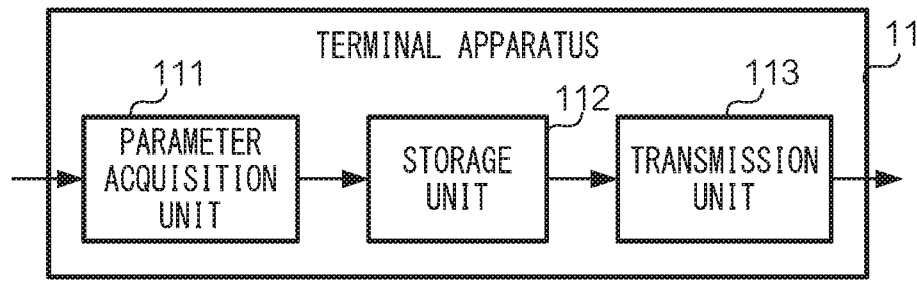
FIG. 4 is a diagram showing a functional configuration of a terminal apparatus according to an embodiment.
FIG. 5 is a diagram illustrating a data configuration of a parameter table to be stored in a terminal apparatus according to an embodiment.

FIG. 4 is a diagram showing a functional configuration of terminal apparatus 11. That is, computer 10 functions as an apparatus including the configurations shown in FIG. 4 by executing data processing according to a program for terminal apparatus 11. Hereinafter, functional constituent units of terminal apparatus 11 shown in FIG. 4 will be described.

Parameter acquisition unit 111 acquires various types of parameters relating to the environment in which vessel 8 is placed (including the voyage state of vessel 8). Examples of the parameters acquired by parameter acquisition unit 111 include deadweight, wind speed, tidal speed, water temperature, vessel speed, position of vessel 8 (hereinafter simply referred to as "position"), and fuel consumption per unit time. Among these parameters, the water temperature, vessel speed, and position are used as parameters that have an influence on the fouling risk of the vessel body in the present embodiment. Vessel 8 includes various types of measurement apparatuses, such as a water temperature meter, a vessel speedometer, and a GNSS (Global Navigation Satellite System), and parameter acquisition unit 111 continuously acquires various types of parameters such as the water temperature, vessel speed, and position measured by these various types of measurement apparatuses. Note that parameter acquisition unit 111 may acquire a parameter input by a crew member or the like of vessel 8 (e.g., a trim value or the like measured visually by a crew member of vessel 8 who does not have a trim meter), for example, in addition to the parameters measured by the measurement apparatus.

Storage unit 112 stores parameters acquired by parameter acquisition unit 111. FIG. 5 is a diagram illustrating a data configuration of a parameter table storing parameters acquired by parameter acquisition unit 111. The parameter table is a collection of records for each period of a predetermined length of time. Representative values (e.g., average values and most recent values) of the parameters acquired in a target period are stored in the records in the parameter table.

Returning to FIG. 4, the description of the functional configuration of terminal apparatus 11 will continue. Upon each elapse of the predetermined time, for example, transmission unit 113 reads out untransmitted parameters from the parameter table stored in storage unit 112 and transmits them to server apparatus 12.

Figures 6, 7:
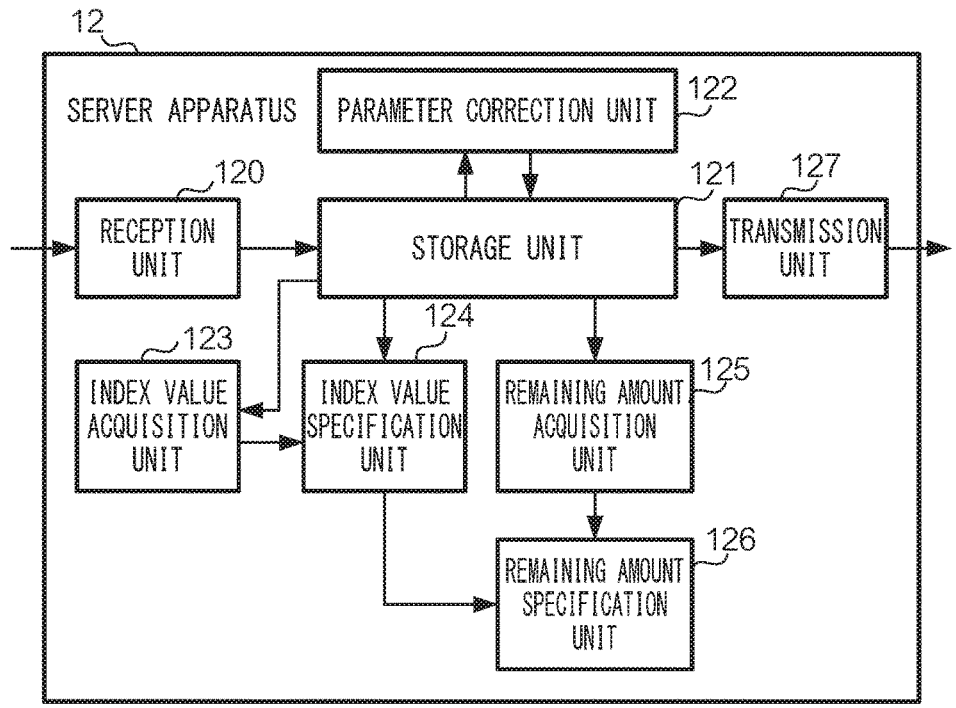
FIG. 6 is a diagram showing a functional configuration of a server apparatus according to an embodiment.
FIG. 7 is a diagram illustrating a data configuration of a paint decrease amount master table stored in a server apparatus according to an embodiment.

FIG. 6 is a diagram showing a functional configuration of server apparatus 12. That is, computer 20 functions as an apparatus including the configuration shown in FIG. 6 by executing data processing according to a program for server apparatus 12. Hereinafter, functional constituent units of server apparatus 12 shown in FIG. 6 will be described.

Reception unit 120 receives the parameters transmitted from terminal apparatus 11. That is, reception unit 120 fulfills a role as a parameter acquisition unit in server apparatus 12. Note that the transmission source of the parameters received by reception unit 120 is not limited to terminal apparatus 11, and for example, parameters that are input to terminal apparatus 13 by a worker for a company that operates vessel 8 or the like and are transmitted from terminal apparatus 13 may be received by reception unit 120 of server apparatus 12.

Storage unit 121 stores various types of data. Storage unit 121 stores a paint decrease amount master table, an attachment strength master table, a resistance increase amount master table, and a log table. Hereinafter, the data configurations of these tables will be described.

FIG. 7 is a diagram illustrating a data configuration of a paint decrease amount master table. The paint decrease amount master table is a table indicating decrease amounts (hereinafter referred to as "paint decrease amounts per unit time") of an anti-fouling paint or an anti-fouling component included in the anti-fouling paint per unit time according to various combinations of water temperature and vessel speed. In the present embodiment, the anti-fouling paint that coats the vessel body is a paint film consumption type of anti-fouling paint, and the remaining amount of the anti-fouling component included in the anti-fouling paint is proportional to the paint film thickness of the remaining anti-fouling paint. Accordingly, in the present embodiment, the decrease amount of the paint film thickness of the anti-fouling paint per day (mm/day) is used as the paint decrease amount per unit time. For example, a second record in the paint decrease amount master table illustrated in FIG. 7 indicates that the film thickness of the anti-fouling paint decreases at a speed of 0.037 mm per day if vessel 8 voyages at a vessel speed of 1 knot in water with a water temperature of 10° C.

As shown in FIG. 7, when the vessel speed is 0 knots, or in other words, when vessel 8 is stopped or moored, the paint decrease amount per unit time differs according to the amount of time for which the vessel continues to be stopped or moored. In general, when the amount of time for which the vessel continues to be stopped or moored increases, the paint decrease amount per unit time decreases. Accordingly, when the time of stopping or mooring continues, fouling of the vessel is more likely to advance.

FIG. 8 is a diagram illustrating a data configuration of the attachment strength master table. The attachment strength master table is a table indicating the strengths of attachment to the vessel body (hereinafter referred to as "attachment strength") of organisms in various bodies of water through which vessel 8 may voyage.

FIG. 9 is a diagram illustrating a data configuration of a resistance increase amount master table. The resistance increase amount master table is a table indicating index values for the resistance increase amount per unit time (hereinafter referred to as "index values for the reference resistance increase amount per unit time"), which are to serve as references corresponding to various combinations of vessel speed and paint decrease amount per unit time.

In the present embodiment, $R_k$ shown in Equation 1 below is used as an index value for the resistance increase amount.

[Equation 1]

$$R_k = C_k/S_k^3 - C_0/S_0^3 \qquad (1)$$

Note that $C_0$ is the fuel consumption per unit time (tons/day) when vessel 8, which has an unfouled vessel body, voyages at vessel speed $S_0$ (knots). Also, $C_k$ is the fuel consumption per unit time (tons/day) when vessel 8, in which the degree of fouling of the vessel body is k, voyages at vessel speed $S_k$ (knots).

Note that vessel speed $S_0$ and fuel consumption per unit time $C_0$ are obtained by carrying out correction based on parameters such as the wind speed, tidal speed, and deadweight (parameters other than the resistance increase amount accompanying fouling of the vessel body, which have an influence on the vessel speed and the fuel consumption per unit time), and are the vessel speed and fuel consumption per unit time in the case where vessel 8, which has an unfouled vessel body, voyages through a reference environment (e.g., in an environment in which wind speed is 0 m/sec, tidal speed is 0 m/sec, deadweight is 10,000 tons, and the like). Similarly, vessel speed $S_k$ and fuel consumption per unit time $C_k$ are obtained by carrying out correction based on parameters such as the wind speed, tidal speed, and deadweight, and are the vessel speed and fuel consumption per unit time in the case where vessel 8, in which the degree of fouling of the vessel body is k, voyages through a reference environment.

It is known that the vessel speed is approximately proportional to the horsepower cubed if vessel 8 voyages in an environment with the same wind speed, tidal speed, deadweight, and the like. Since the fuel consumption per unit time is approximately proportional to the horsepower, the vessel speed is approximately proportional to the fuel consumption per unit time cubed. Accordingly, when vessel 8 with an unfouled vessel body voyages, $C_0/S_0^3$ takes an approximately constant value, regardless of the magnitude of vessel speed $S_0$. Similarly, when vessel 8 with a vessel body fouling degree of k voyages, $C_k/S_k^3$ takes an approximately constant value regardless of the magnitude of vessel speed $S_k$. When vessel body fouling degree k increases, $C_k/S_k^3$ increases. Accordingly, $R_k$ shown in Equation 1 fulfills the role of an index value indicating the magnitude of the resistance increase amount accompanying fouling of the vessel body.

The index values for the reference resistance increase amount per unit time shown in the resistance increase amount master table (FIG. 9) indicate increase amounts of index value $R_k$ when vessel 8 voyages for one day through a body of water with an attachment strength of "1". For example, the first record in the resistance increase amount master table illustrated in FIG. 9 indicates that index value $R_k$ increases by 0.118 accompanying advancement of the fouling of the vessel in the case where vessel 8 voyages through a body of water with an attachment strength of "1" at a vessel speed of 5 knots and the paint decrease amount per unit time at that time is 0.035 mm/day.

The data stored in the paint decrease amount master table, the attachment strength master table, and the resistance increase amount master table differs depending on the type of the anti-fouling paint. These tables are created for each type of anti-fouling paint by the company that operates vessel body fouling risk management system 1 or the like based on performance data of the anti-fouling paint obtained from the company that manufactures the anti-fouling paint, the water depths of bodies of water, the types of organisms inhabiting the bodies of water, and the like, for example, and these tables are stored in storage unit 121.

FIG. 10 is a diagram illustrating a data configuration of a log table. The log table is a table for accumulating various types of parameters that reception unit 120 continuously receives from terminal apparatus 11, and accumulating various types of data generated by server apparatus 12 using these various types of parameters. The log table is provided with "body of water", "corrected vessel speed", "intra-period paint decrease amount", "cumulative paint decrease amount", "paint remaining amount", "intra-period $R_k$ increase amount", "estimated $R_k$", and "actual $R_k$" as fields for storing the various types of data generated by server apparatus 12. The data stored in these fields will be described later.

New records are added to the log table each time the combination of parameters received from terminal apparatus 11 changes. Data indicating the period for which the combination of parameters received from terminal apparatus 11 is maintained is stored in the "period" field of the log table. When a new record is added to the log table, data indicating the period for which the combination of parameters was maintained is stored in the "period" field of the record (hereinafter referred to as "current record") prior to the new record.

Returning to FIG. 6, description of the functional constituent units of server apparatus 12 will continue. When a new record is added to the log table, parameter correction unit 122 specifies a corrected vessel speed obtained by correcting the vessel speed of the new record based on the deadweight, wind speed, tidal speed, and the like of the new record. The corrected vessel speed specified by parameter correction unit 122 is an estimated value of the vessel speed of vessel 8 in the case where it is assumed that vessel 8 performs a voyage with a horsepower corresponding to the fuel consumption per unit time indicated in the new record, in a reference environment (e.g., an environment in which the wind speed is 0 m/sec, tidal speed is 0 m/sec, deadweight is 10,000 tons, and the like). The corrected vessel speed specified by parameter correction unit 122 is stored in the "corrected vessel speed" field of the new record.

Also, when a new record is added to the log table, parameter correction unit 122 specifies the body of water corresponding to the position of the new record, in accordance with map data stored in advance in storage unit 121, for example. The body of water specified by parameter correction unit 122 is stored in the "body of water" field of the new record.

Each time a new record is added to the log table (FIG. 10), index value acquisition unit 123 reads out the period, water temperature, vessel speed, and body of water from the current record, reads out the index values corresponding to those parameters from the paint decrease amount master table (FIG. 7), the attachment strength master table (FIG. 8), and the resistance increase amount master table (FIG. 9), and transfers them to index value specification unit 124.

More specifically, if the vessel speed of the current record is 0 knots, index value acquisition unit 123 reads out a paint decrease amount per unit time corresponding to the combination of the water temperature and vessel speed of the current record and the amount of time for which the vessel speed of 0 knots continues, which is indicated by the period of the current record and the period of a record read-out in the past, from the paint decrease amount master table (FIG. 7). If the vessel speed of the current record is not 0 knots, index value acquisition unit 123 reads out the paint decrease amount per unit time corresponding to the combination of the water temperature and the vessel speed of the current record from the paint decrease amount master table (FIG. 7).

Next, from the attachment strength master table (FIG. 8), index value acquisition unit 123 reads out the attachment strength corresponding to the body of water read out from the log table. Also, from the resistance increase amount master table (FIG. 9), index value acquisition unit 123 reads out the index value for the reference resistance increase amount per unit time corresponding to the combination of the vessel speed read out from the log table and the paint decrease amount per unit time read out from the paint decrease amount master table. Index value acquisition unit 123 transfers the read-out paint decrease amount per unit time, attachment strength, and index value for the reference resistance increase amount per unit time to index value specification unit 124.

Each time a new record is added to the log table (FIG. 10), index value specification unit 124 reads out the period from the current record and receives the paint decrease amount per unit time, attachment strength, and index value for the reference resistance increase amount per unit time corresponding to the current record from index value acquisition unit 123.

Index value specification unit 124 calculates the intra-period paint decrease amount by multiplying the length of time of the period read out from the log table by the paint decrease amount per unit time received from index value acquisition unit 123. The intra-period paint decrease amount is an amount of anti-fouling paint that dissolves in the period corresponding to the current record. Index value specification unit 124 stores the calculated intra-period paint decrease amount in the "intra-period paint decrease amount" field of the current record.

When the intra-period paint decrease amount is stored in the current record of the log table, index value specification unit 124 adds the intra-period paint decrease amount of the current record to the cumulative paint decrease amount of the record prior to the current record to calculate a new cumulative paint decrease amount. The cumulative paint decrease amount is an amount of anti-fouling paint that has dissolved in the period from the time when coating with the anti-fouling paint was last performed on vessel 8 to the current time. Index value specification unit 124 stores the calculated cumulative paint decrease amount in the "cumulative paint decrease amount" field of the current record.

Also, index value specification unit 124 calculates the intra-period $R_k$ increase amount by multiplying the attachment strength received from index value acquisition unit 123 and the length of time of the period read out from the log table, by the index value for the reference resistance increase amount per unit time received from index value acquisition unit 123. The intra-period $R_k$ increase amount is an index value indicating an increase amount of resistance accompanying fouling of the vessel body that has advanced in the period corresponding to the current record. Index value specification unit 124 stores the calculated intra-period $R_k$ increase amount in the "intra-period $R_k$ increase amount" field of the current record.

When the intra-period $R_k$ increase amount is stored in the current record of the log table, index value specification unit 124 calculates a new estimated $R_k$ by adding the intra-period $R_k$ increase amount of the current record to the estimated $R_k$ of the record prior to the current record. Index value specification unit 124 stores the calculated estimated $R_k$ in the "estimated $R_k$" field of the current record.

Also, index value specification unit 124 reads out the corrected vessel speed and the fuel consumption per unit time from the current record of the log table and calculates $R_k$ according to Equation 1 described above using read-out corrected vessel speed $S_k$ and read-out fuel consumption per unit time as $C_k$. Hereinafter, "actual $R_k$" will be used in order to distinguish $R_k$ calculated by index value specification unit 124 according to Equation 1 from the above-described estimated $R_k$. Index value specification unit 124 stores the calculated actual $R_k$ in the "actual $R_k$" field of the current record.

The estimated $R_k$ and the actual $R_k$ calculated by index value specification unit 124 are both index values indicating the increase amount of the resistance accompanying fouling of the vessel body that has advanced in the period from the time when the vessel body of vessel 8 was last cleaned to the present time.

From storage unit 121, remaining amount acquisition unit 125 reads out data (hereinafter referred to as "reference-time remaining amount data") indicating the remaining amount of paint at the time when coating with the anti-fouling paint was last performed, and transfers it to remaining amount specification unit 126. Note that the reference-time remaining amount data is data that is input to terminal apparatus 13 by a worker of the company that operates vessel 8, for example, and is transmitted from terminal apparatus 13 to server apparatus 12.

When the cumulative paint decrease amount is stored in the current record of the log table, remaining amount specification unit 126 calculates the paint remaining amount by subtracting the cumulative paint decrease amount of the current record from the paint remaining amount indicated by the reference-time remaining amount data received from remaining amount acquisition unit 125. The paint remaining amount is the current remaining amount of the paint. Remaining amount specification unit 126 stores the calculated paint remaining amount in the "paint remaining amount" field of the current record.

Transmission unit 127 transmits various types of data to terminal apparatus 11 or terminal apparatus 13. The functional constituent units of server apparatus 12 have been described above.

Terminal apparatus 13 gives a request for data relating to the fouling risk of vessel 8 to server apparatus 12 according to a user operation, and displays information relating to the fouling risk of vessel 8 in accordance with data transmitted from server apparatus 12 according to the request. Since terminal apparatus 13 is a general terminal apparatus that receives data transmission from server apparatus 12, description of the functional configuration of terminal apparatus 13 is omitted.

Figure 11:
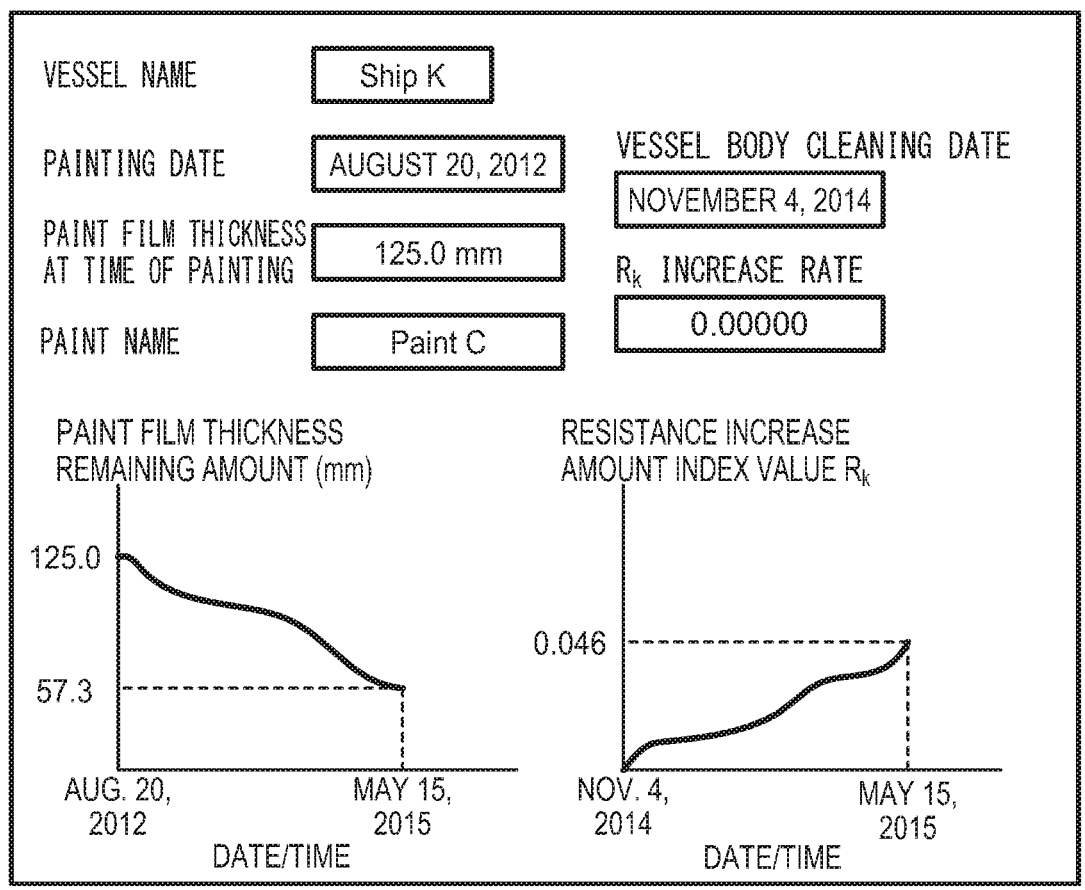
FIG. 11 is a diagram illustrating a fouling risk display screen displayed by a terminal apparatus according to an embodiment.

FIG. 11 is a diagram illustrating a fouling risk display screen displayed by terminal apparatus 11 or terminal apparatus 13 in accordance with data transmitted from server apparatus 12. The vessel name for identifying vessel 8, the date on which coating with the anti-fouling paint was last performed on vessel 8, the film thickness at the time of painting, the paint name for identifying the type of the anti-fouling paint, and the date on which the vessel body of vessel 8 was last cleaned are displayed on the fouling risk display screen.

Also, an index value indicating the "$R_k$ increase speed" is displayed on the fouling risk display screen. The $R_k$ increase speed is a value obtained by dividing the intra-period $R_k$ increase amount of the most recent record in the log table by the length of time of the period of the record, and indicates the advancement rate of the fouling of the vessel body.

Also, a graph that is generated according to the data in the "period" field and the "paint remaining amount" field of the log table and indicates change over time in the remaining amount of the paint, and a graph that is generated according to the data in the "period" field and the "actual $R_k$" field (or the "estimated $R_k$" field) of the log table and indicates change over time in the index value of the resistance increase amount are displayed on the fouling risk display screen.

By viewing the fouling risk display screen, a crew member of vessel 8, a worker of the company that operates vessel 8, a worker of the company that manufactures the anti-fouling paint, a worker of the company that performs coating with the anti-fouling paint, or the like can find out the remaining amount of the paint film thickness of vessel 8 and the resistance increase amount accompanying the advancement of fouling of the vessel body essentially in real time.

Figure 12:
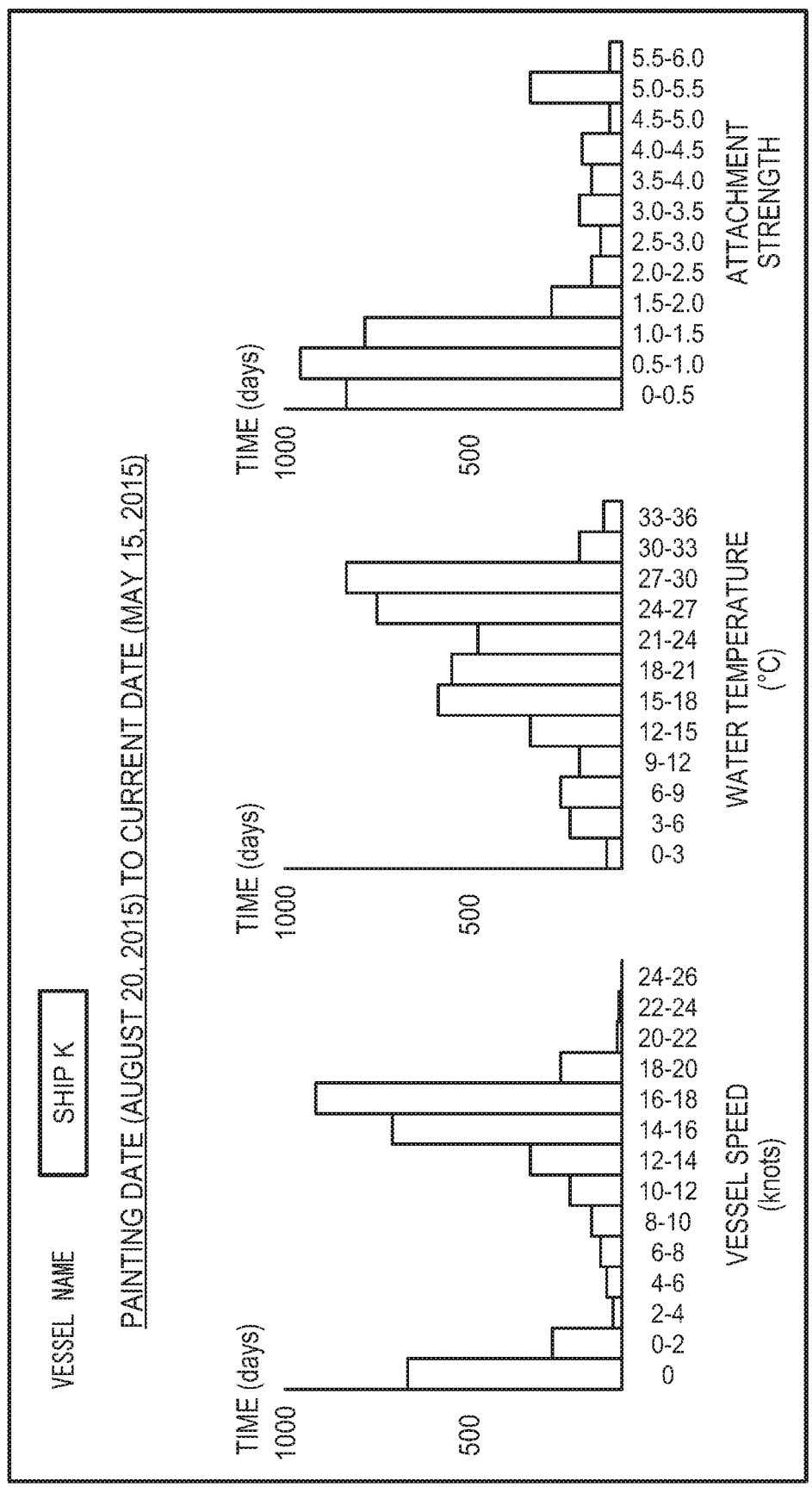
FIG. 12 is a diagram illustrating a fouling factor display screen displayed by a terminal apparatus according to an embodiment.

FIG. 12 is a diagram illustrating a fouling factor display screen displayed by terminal apparatus 11 or terminal apparatus 13 in accordance with data transmitted from server apparatus 12. Histograms for the water temperature, vessel speed, and attachment strength are displayed for the period from the day when coating with the anti-fouling paint was last performed on vessel 8 to the current time are displayed on the fouling factor display screen.

The vertical axis of the histogram for water temperature displayed on the fouling factor display screen indicates the integrated values for time of being at the water temperatures indicated on the horizontal axis in the target period. Also, the vertical axis of the histogram for vessel speed displayed on the fouling factor display screen indicates the integrated values for time of performing voyage at the vessel speeds indicated on the horizontal axis in the target period. Also, the vertical axis of the histogram for attachment strength displayed on the fouling factor display screen indicates the integrated values for time of voyaging in bodies of water with the attachment strengths indicated on the horizontal axis in the target period.

By viewing the fouling factor display screen, a crew member of vessel 8, a worker of the company that operates vessel 8, a worker of the company that manufactures the anti-fouling paint, a worker of the company that performs coating with the anti-fouling paint, or the like can survey the strength and weakness of factors that have an influence on the fouling of the vessel in the environment in which a voyage of vessel 8 is performed.

According to vessel body fouling risk management system 1, a crew member of vessel 8, a worker of a company that operates vessel 8, a worker of a company that performs coating with the anti-fouling paint, or the like can correctly determine the timing of adding a coat of anti-fouling paint and cleaning the vessel body, and the specifications (type and paint film thickness) of the anti-fouling paint to be added. Also, according to vessel body fouling risk management system 1, the manufacturing company of the anti-fouling paint can develop an anti-fouling paint with a performance suitable for the environment through which vessel 8 voyages.

Example

The above-described embodiment can be modified in various ways within the scope of the technical idea of the present invention. Examples of these modifications will be given below. Note that two or more modified examples below may be combined.

(1) In the above-described embodiment, server apparatus 12 specifies the remaining amount of the paint, the index value for the resistance increase amount, and the like each time a new record is added to the log table (FIG. 10). The timing for specifying the paint remaining amount, the index value for the resistance increase amount, and the like is not limited thereto. For example, it is also possible to employ a configuration in which server apparatus 12 specifies the remaining amount of the paint, the index value for the resistance increase amount, and the like for an unprocessed record in the log table each time a predetermined amount of time elapses.

(2) In the above-described embodiment, server apparatus 12 specifies the remaining amount of the paint, the index value for the resistance increase amount, and the like for a voyage performed in the past. The target period in which the paint remaining amount, the index value for the resistance increase amount, and the like are specified is not limited to a past period. For example, it is also possible to employ a configuration in which server apparatus 12 specifies the remaining amount of the paint, the index value for the resistance increase amount, and the like for a planned voyage of vessel 8 in a future period.

In such a case, reception unit 120 of server apparatus 12 receives, from terminal apparatus 13 or the like, a future planned voyage schedule for vessel 8 (vessel route and date of voyage), planned deadweight for the voyage according to the voyage schedule, an estimated value for the water temperature of the body of water through which vessel 8 is to voyage according to the voyage schedule (e.g., average water temperature or the like in a period of voyaging), an estimated value for weather phenomena or marine phenomena encountered by vessel 8 that is to voyage according to the voyage schedule (e.g., average wind speed, average tidal speed, and the like in the period and body of water in which the voyage is to be performed), and the like, and reception unit 120 writes the received data in the log table (FIG. 10). At this time, the case described in the above-described embodiment is similar in that a record is added each time the combination of the water temperature, vessel speed, and the like changes, and data indicating the period for which the combination of the water temperature, vessel speed, and the like is maintained is stored in the "period" field.

Parameter correction unit 122, index value acquisition unit 123, index value specification unit 124, remaining amount acquisition unit 125, and remaining amount specification unit 126 use the data such as the period, water temperature, and vessel speed relating to the future voyage written in the log table to calculate the body of water, corrected vessel speed, intra-period paint decrease amount, intra-period $R_k$ increase amount, cumulative paint decrease amount, paint thickness remaining amount, estimated $R_k$, and actual $R_k$, and store these calculated values in the log table.

Figure 13:
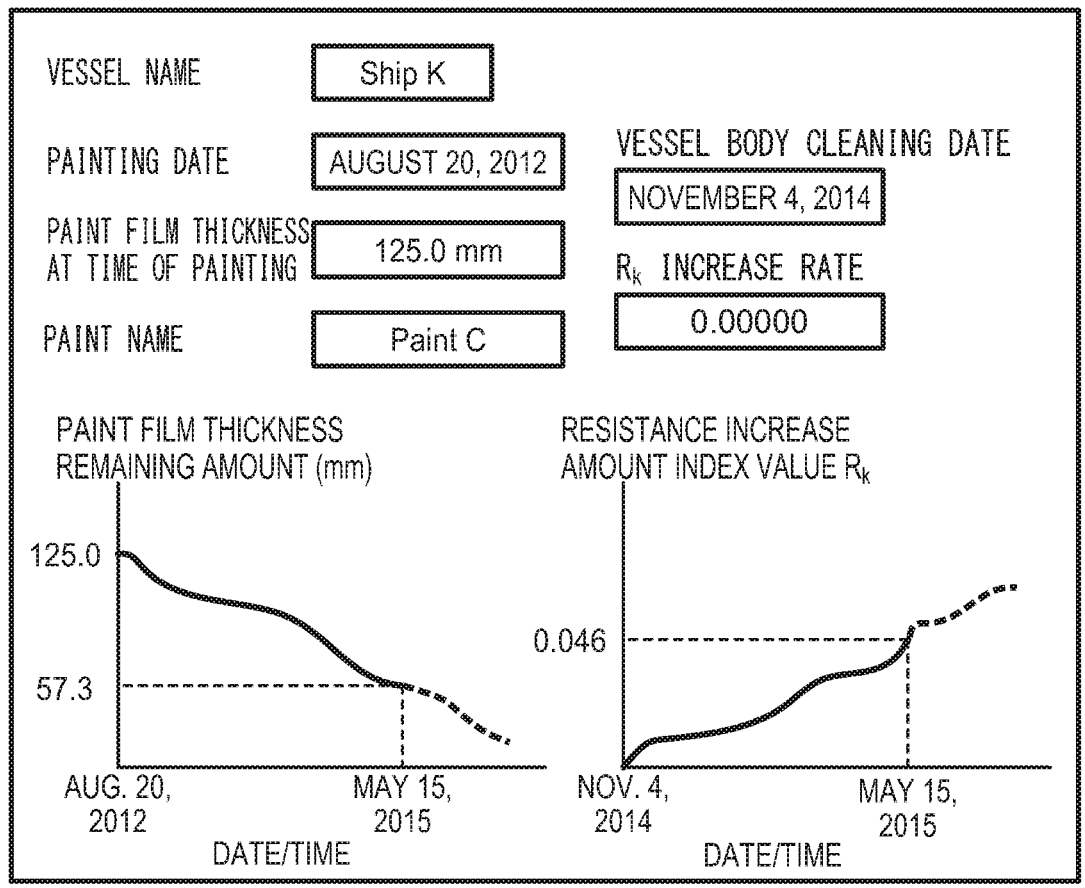
FIG. 13 is a diagram illustrating a fouling risk display screen displayed by a terminal apparatus according to a modified example.

FIG. 13 is a diagram illustrating a fouling risk display screen displayed on terminal apparatus 11 or terminal apparatus 13 in this modified example. The solid line portion of the graph on the left side shown on the fouling risk display screen illustrated in FIG. 13 indicates transitions in the paint remaining amount specified based on a record relating to a past period of a record stored in the log table, and the broken line portion indicates transitions in the paint remaining amount specified based on the record relating to the future period. Also, the solid line portion of the graph on the right side shown on the fouling risk display screen illustrated in FIG. 13 indicates transitions in the actual $R_k$ specified based on a record relating to a past period of a record stored in the log table, and the broken line portion indicates transitions in the estimated $R_k$ specified based on the record relating to the future period.

According to this modified example, by viewing the fouling risk display screen, the company that operates vessel 8 or the like can make arrangements with sufficient temporal leeway such that a coat of the anti-fouling paint is added and the vessel body is cleaned at the appropriate timing. Also, by viewing the fouling risk display screen, the company that operates vessel 8 or the like can know in advance the vessel body fouling risk in the case of following the planned voyage schedule.

(3) In the above-described embodiment, server apparatus 12 specifies the paint remaining amount, the index value for the resistance increase amount, and the like using the paint decrease amount master table, the attachment strength master table, and the resistance increase amount master table that correspond to the anti-fouling paint used on vessel 8. A configuration may be employed in which server apparatus 12 specifies the paint remaining amount, the index value for the resistance increase amount, and the like using the paint decrease amount master table, the attachment strength master table, and the resistance increase amount master table that correspond to another type of anti-fouling paint that is different from the anti-fouling paint used on vessel 8.

For example, on the fouling risk display screen (FIG. 11), paint names corresponding to multiple types of anti-fouling paints are displayed as a list in the "paint name" field and the user can select a paint name. When the user selects a paint name from the paint names displayed in the list, terminal apparatus 11 or terminal apparatus 13 transmits the paint name selected by the user to server apparatus 12. Server apparatus 12 calculates the intra-period paint decrease amount, the estimated $R_k$, and the like in the log table (FIG. 10) using the paint decrease amount master table, the attachment strength master table, and the resistance increase amount master table corresponding to the paint name transmitted from terminal apparatus 11 or terminal apparatus 13, and updates the log table. The graphs on the fouling risk display screen are updated according to the data of the updated log table.

According to this modified example, a crew member or the like of vessel 8 can know the transitions in the remaining amount of the paint and the resistance increase amount accompanying fouling of the vessel in the case of hypothetically using a type of anti-fouling paint that is different from the anti-fouling paint currently being used. Accordingly, a crew member or the like of vessel 8 can specify the anti-fouling paint that is appropriate for the voyage of vessel 8 by sequentially selecting the paint names of various anti-fouling paints on the fouling risk display screen.

Also, a configuration may be employed in which server apparatus 12 calculates the intra-period paint decrease amount, the estimated $R_k$, and the like for every selectable type of anti-fouling paint and provides, to the user, the paint names of the anti-fouling paints that were extracted and sorted according to predetermined conditions (e.g., conditions relating to the length of the period up to when the remaining amount of the paint reaches a predetermined threshold indicating a limit value, and the length of a period up to when the index value for the resistance increase amount reaches a predetermined threshold value indicating a limit value) based on the calculation results.

(4) A configuration may be used in which server apparatus 12 corrects the paint decrease amount per unit time in the paint decrease amount master table (FIG. 7) based on the measured remaining amount of the paint.

In this modified example, server apparatus 12 includes a decrease amount acquisition unit and an index value correction unit as functional constituent units. Each time the remaining paint film thickness is measured and input to server apparatus 12, the decrease amount acquisition unit calculates the measurement value for the decrease amount of the paint film thickness in the period from the timing when the previous measurement was performed up to the timing when the most recent measurement was performed (hereinafter referred to as "decrease amount measurement period"), and stores it in storage unit 121. Measurement of the remaining paint film thickness is performed by a paint film thickness measurement device when vessel 8 enters a dock, for example.

After the measurement values for the decrease amount of the paint film thickness relating to multiple decrease amount measurement periods are accumulated in storage unit 121, the index value correction unit extracts the record for the period corresponding to the decrease amount measurement period from the log table (FIG. 10) for each of the multiple decrease amount measurement periods. From the paint decrease amount master table (FIG. 7), the index value correction unit reads out the decrease amount per unit time corresponding to the combination of water temperature and vessel speed of the extracted record.

The index value correction unit specifies the paint film thickness decrease amount in the decrease amount measurement period by adding up the intra-period paint decrease amounts in the record extracted from the log table. The decrease amount is the decrease amount specified by index value specification unit 124. For each of the multiple decrease amount measurement periods, the index value correction unit adjusts the paint decrease amount per unit time read out from the paint decrease amount master table (FIG. 7) such that the decrease amount of the paint film thickness specified by index value specification unit 124 approaches the measurement value of the decrease amount of the paint film thickness calculated by the decrease amount acquisition unit. The index value correction unit updates the decrease amount master table using the adjusted paint decrease amount per unit time.

According to this modified example, the index value used to specify the remaining amount of the paint is corrected based on the measured paint remaining amount. As a result, the accuracy of the paint remaining amount specified by server apparatus 12 increases.

Also, a configuration may be used in which the index value correction unit corrects the attachment strength in the attachment strength master table (FIG. 8) and the index value for the reference resistance increase amount per unit time in the resistance increase amount master table (FIG. 9) based on the actual $R_k$ (measurement value for the degree of influence on the increase in resistance that occurs during a voyage of the vessel) specified by index value specification unit 124 (an example of an influence degree acquisition unit). In this case, every time the attachment strength stored in the attachment strength master table and the index value for the reference resistance increase amount per unit time stored in the resistance increase amount master table are modified, the index value correction unit repeats the processing for calculating the estimated $R_k$ using the data accumulated in the log table, and adjusts the attachment strength and the index value for the reference resistance increase amount per unit time such that the estimated $R_k$ is closer to the actual $R_k$. The index value correction unit updates the attachment strength master table using the adjusted attachment strength and updates the resistance increase amount master table using the adjusted index value for the reference resistance increase amount per unit time.

In this case, the index value used to specify the estimated $R_k$ is corrected based on the actual $R_k$ specified based on the calculated vessel speed and fuel consumption per unit time. As a result, the accuracy of the estimated $R_k$ specified by server apparatus 12 increases.

(5) In the above-described embodiment, a portion of the processing performed by server apparatus 12 may be performed by terminal apparatus 11. For example, the following configuration may be employed. Terminal apparatus 11 includes parameter correction unit 122, index value acquisition unit 123, index value specification unit 124, remaining amount acquisition unit 125, and remaining amount specification unit 126, which are included in server apparatus 12 according to the above-described embodiment. Also, storage unit 112 of terminal apparatus 11 stores various types of data stored by storage unit 121 of server apparatus 12 according to the above-described embodiment. Terminal apparatus 11 specifies the paint remaining amount, the estimated $R_k$, the actual $R_k$, and the like and accumulates them in the log table, and each time a predetermined amount of time elapses, for example, terminal apparatus 11 transmits the untransmitted data in the log table to server apparatus 12. Server apparatus 12 stores a copy of the log table stored by terminal apparatus 11 in storage unit 121 and stores the data transmitted from terminal apparatus 11 in the log table in storage unit 121.

According to this modified example as well, a crew member or the like of vessel 8 can use terminal apparatus 11 or terminal apparatus 13 to access server apparatus 12 and view the fouling risk display screen and the fouling factor display screen.

(6) In the above-described embodiment, the anti-fouling paint was of a paint film consumption type, but the anti-fouling paint used on vessel 8 for which the fouling risk is managed by vessel body fouling risk management system 1 is not limited to being of a paint film consumption type. If an anti-fouling paint that is not of a paint film consumption type is used on vessel 8 managed by vessel body fouling risk management system 1, the decrease amount and remaining amount of the paint film thickness in the above-described embodiment can be rephrased as a decrease amount and remaining amount of an anti-fouling component contained in the anti-fouling paint.

(7) In the above-described embodiment, server apparatus 12 uses the water temperature, vessel speed, and position of vessel 8 to specify the index values for the paint remaining amount and the resistance increase amount. The parameters used to specify the index values for the paint remaining amount and the resistance increase amount are not limited to the water temperature, vessel speed, and position of vessel 8. For example, other types of parameters, such as wave height, draft, and water depth and water temperature of body of water through which the voyage is performed may be used to specify the index values for the paint remaining amount and the resistance increase amount.

(8) In the above-described embodiment, server apparatus 12 receives the parameters measured on vessel 8 from terminal apparatus 11 and uses them. The parameters used by server apparatus 12 need not be parameters measured on vessel 8. For example, server apparatus 12 may receive the water temperature, wind speed, tidal speed, and the like, which are transmitted from a server apparatus that transmits various types of data relating to weather phenomena and marine phenomena, and server apparatus 12 may use them.

(9) In the above-described embodiment, server apparatus 12 specifies the index values for the paint remaining amount and the resistance increase amount as index values for the fouling risk of the vessel body. The index values for the fouling risk of the vessel body specified by server apparatus 12 are not limited to these.

For example, a configuration may be employed in which server apparatus 12 calculates the index values for the fouling risk of the vessel body based on the histograms displayed on the fouling factor display screen (FIG. 12). In this case, for example, weight values corresponding to the values on the horizontal axes of the histograms are stored in storage unit 121. Server apparatus 12 multiplies the weight values corresponding to the values on the horizontal axes of the histograms by the values indicated by the vertical axes of the histograms and adds the results in order to calculate an index value for the fouling risk of the vessel body. The index value calculated in this manner does not directly indicate the paint remaining amount and the resistance increase amount, but indicates how high the likelihood is that the vessel body has been fouled.

(10) In the above-described embodiment, parameter correction unit 122 of server apparatus 12 specifies the vessel speed in the case where it is assumed that the fuel consumption per unit time is maintained, as the corrected vessel speed. Instead of this, a configuration may be employed in which parameter correction unit 122 specifies the fuel consumption per unit time in the case where it is assumed that the vessel speed is maintained, as the corrected fuel consumption per unit time. In this case, when the estimated $R_k$ is calculated in accordance with Equation 1, index value specification unit 124 uses the vessel speed received from terminal apparatus 11 as $S_k$ and uses the corrected fuel consumption per unit time specified by parameter correction unit 122 as $C_k$.

(11) In the above-described embodiment, the estimated $R_k$, which is the index value for the resistance increase amount, is specified in accordance with Equation 1. Any index value may be used as the index value for the resistance increase amount, as long as it is an index value that is correlated with the resistance increase amount accompanying fouling of the vessel body. Accordingly, the index value for the resistance increase amount may be specified according to a calculation equation, correlation table, or the like that is different from Equation 1.

Also, in the above-described embodiment, the vessel speed and fuel consumption per unit time are used to specify the index value for the resistance increase amount. The parameters used to specify the index value for the resistance increase amount are not limited to the combination of the vessel speed and the fuel consumption per unit time, and any combination of parameters may be used to specify the index value for the resistance increase amount, as long as it is a combination of a parameter correlated with the vessel speed, and a parameter correlated with the fuel consumption per unit time. Examples of parameters correlated with vessel speed include the propeller rotation rate. Also, examples of parameters correlated with the fuel consumption per unit time include the horsepower of the motor used to propel the vessel. Accordingly, any combination, such as the vessel speed and horsepower, the propeller rotation rate and fuel consumption per unit time, or the propeller rotation rate and horsepower, for example, may be used to specify the index value for the resistance increase amount.

(12) In the above-described embodiment, terminal apparatus 11, server apparatus 12, and terminal apparatus 13 are realized by general computers executing processing in accordance with programs. Instead of this, at least one of terminal apparatus 11, server apparatus 12, and terminal apparatus 13 may be constituted as a so-called dedicated apparatus.

(13) In the above-described embodiment, the program that is executed by computer 10 in order to realize terminal apparatus 11 may be downloaded to computer 10 via a network such as the Internet, for example, and may be permanently stored in a storage medium, distributed, and loaded to computer 10 from the storage medium.

REFERENCE SIGNS LIST

1 Vessel body fouling risk management system
8 Vessel
9 Communication satellite
10 Computer
11 Terminal apparatus
12 Server apparatus
13 Terminal apparatus
20 Computer
101 Memory
102 Processor
103 Communication IF
104 Display apparatus
105 Operation apparatus
111 Parameter acquisition unit
112 Storage unit
113 Transmission unit
120 Reception unit
121 Storage unit
122 Parameter correction unit
123 Index value acquisition unit
124 Index value specification unit
125 Remaining amount acquisition unit
126 Remaining amount specification unit
127 Transmission unit
201 Memory
202 Processor
203 Communication IF

What is claimed is:

1. An apparatus, comprising:
a parameter acquisition unit for acquiring, continuously during a voyage of a vessel, a plurality of parameters relating to an environment in which the vessel is placed, the plurality of parameters including at least one of a speed of the vessel and one of characteristics of a body of water in which the vessel is placed and a position of the vessel;
an index value acquisition unit for acquiring a first index value indicating a rate of likelihood of occurrence of fouling of a water contacting surface of the vessel per a unit of time in the body of water in which the vessel is placed based on the plurality of parameters acquired by the parameter acquisition unit; and
an index value specification unit for specifying a second index value indicating the likelihood of the occurrence of fouling of the water contacting surface of the vessel in a first period of time in the body of water, based on the first index value.

2. The apparatus according to claim 1,
wherein the parameter acquisition unit acquires water temperature of the body of water in which the vessel is placed and the speed of the vessel as the parameters, and
the first index value and the second index value indicate a reduction of an anti-fouling paint on the water contacting surface of the vessel or an anti-fouling component contained in the anti-fouling paint based on the water temperature of the body of water in which the vessel is placed and the speed of the vessel as the parameters acquired by the parameter acquisition unit.

3. The apparatus according to claim 2,
wherein the parameter acquisition unit acquires the parameters for each of a plurality of periods constituting the first period,
the index value acquisition unit acquires the first index value for each of the plurality of periods, and
for each of the plurality of periods, based on the first index value acquired by the index value acquisition unit for the period, the index value specification unit specifies a third index value indicating the likelihood of the occurrence of fouling of the water contacting surface of the vessel in an environment indicated by the parameters acquired by the parameter acquisition unit for the period, and specifies the second index value based on a plurality of the third index values that were specified.

4. The apparatus according to claim 3, comprising:
a remaining amount acquisition unit for acquiring a remaining amount of the anti-fouling paint on the water contacting surface of the vessel or the anti-fouling component contained in the anti-fouling paint at a start timing of the first period; and
a remaining amount specification unit for specifying a remaining amount of the anti-fouling paint on the water contacting surface of the vessel or the anti-fouling component contained in the anti-fouling paint at an end timing of the first period, based on the remaining amount of the anti-fouling component and the second index value.

5. The apparatus according to claim 3,
wherein the index value acquisition unit acquires the first index value for each of a plurality of types of anti-fouling paint, and
the index value specification unit specifies the second index value for each of the plurality of types of anti-fouling paint.

6. The apparatus according to claim 2, comprising:
a reduction acquisition unit for acquiring a measurement value of the reduction of the anti-fouling paint on the water contacting surface of the vessel or the anti-fouling component contained in the anti-fouling paint in the first period; and
an index value correction unit for, for each of a plurality of the first periods, correcting the first index value based on the parameters acquired by the parameter acquisition unit and the measurement value acquired by the reduction acquisition unit.

7. The apparatus according to claim 1,
wherein the parameter acquisition unit acquires the speed of the vessel and the position of the vessel in the body of water as the parameters, and
the first index value and the second index value indicate degrees of influence that attached matter on the water contacting surface of the vessel has on an increase in resistance that occurs during a voyage of the vessel based on the position of the vessel in the body of water and the speed of the vessel as the parameters acquired by the parameter acquisition unit.

8. The apparatus according to claim 7, wherein the parameter acquisition unit acquires a reduction of the anti-fouling paint on the water contacting surface of the vessel or the anti-fouling component contained in the anti-fouling paint, as the parameter.

9. The apparatus according to claim 7,
wherein the parameter acquisition unit acquires the parameter for each of a plurality of periods constituting the first period,
the index value acquisition unit acquires the first index value for each of the plurality of periods, and
for each of the plurality of periods, based on the first index value acquired by the index acquisition unit for the period, the index value specification unit specifies a third index value indicating the degree of influence that attached matter on the water contacting surface of the vessel has on an increase in resistance that occurs during the voyage of the vessel in the environment indicated by the parameter acquired by the parameter acquisition unit for the period, and specifies the second index value based on a plurality of the third index values that were specified.

10. The apparatus according to claim 9,
wherein the index value acquisition unit acquires the first index value for each of a plurality of types of anti-fouling paint, and
the index value specification unit specifies the second index value for each of the plurality of types of anti-fouling paint.

11. The apparatus according to claim 7, comprising:
an influence degree acquisition unit for acquiring a measurement value for the degree of influence that the attached matter on the water contacting surface of the vessel has on an increase in resistance that occurs during the voyage of the vessel in the first period; and
an index value correction unit for, for each of a plurality of the first periods, correcting the first index value based on the parameter acquired by the parameter acquisition unit and the measurement value acquired by the influence degree acquisition unit.

12. The apparatus according to claim 1,
wherein the parameter acquisition unit acquires the speed of the vessel or a physical amount correlated with the speed of the vessel, and the fuel consumption of the vessel or a physical amount correlated with the fuel consumption of the vessel, as the parameters, and
the first index value and the second index value indicate degrees of influence that attached matter on the water contacting surface of the vessel has on an increase in resistance that occurs during the voyage of the vessel.

13. A computer-readable storage medium permanently storing a program for causing a computer to execute:
processing for acquiring, continuously during a voyage of a vessel, a plurality of parameters relating to an environment in which a vessel is placed, the plurality of parameters including at least one of a speed of the vessel and one of characteristics of the body of water in which the vessel is placed and a position of the vessel;
processing for acquiring a first index value indicating a rate of likelihood of occurrence of fouling of a water contacting surface of the vessel per a unit of time in the body of water in which the vessel is placed based on the plurality of parameters acquired; and
processing for specifying a second index value indicating a likelihood of occurrence of fouling of the water contacting surface of the vessel in a first period of time in the body of water, based on the first index value.

* * * * *